June 4, 1968 W. SMEIMAN 3,387,265
VALIDATION MEANS
Filed June 7, 1963
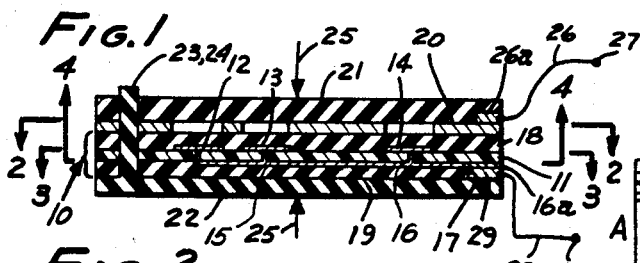
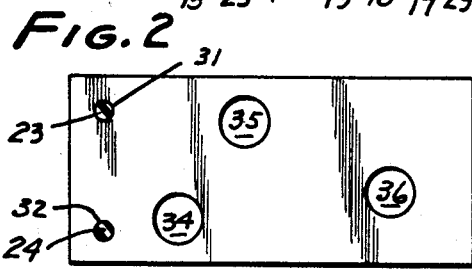
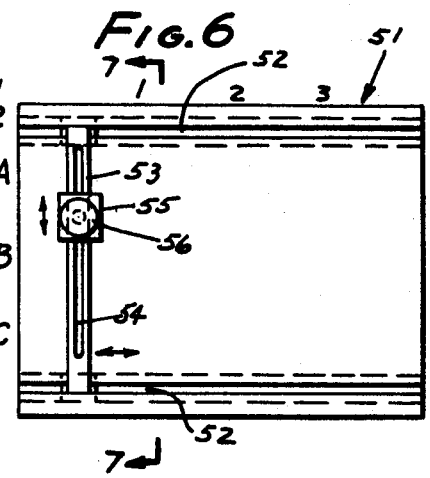
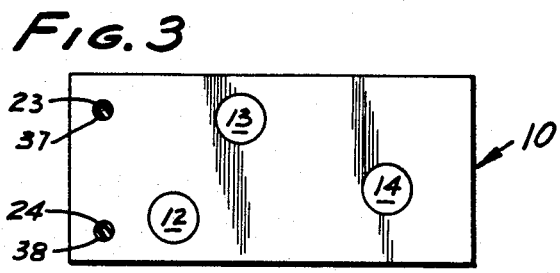
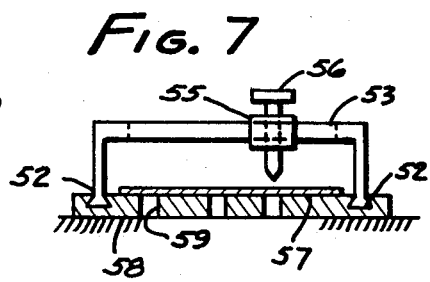
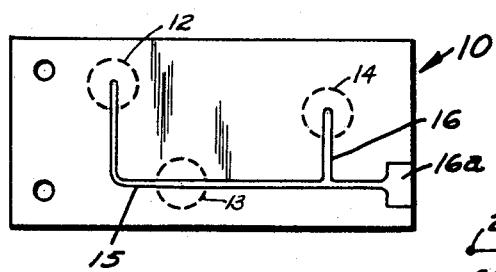
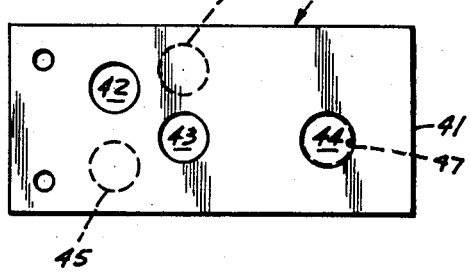
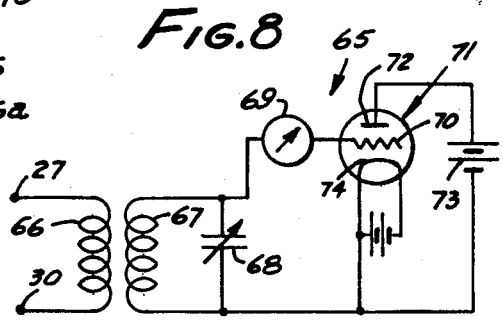
INVENTOR.
WILFRED SMEIMAN
BY
ATTORNEYS.

United States Patent Office 3,387,265
Patented June 4, 1968

3,387,265
VALIDATION MEANS
Wilfred Smeiman, 1614 Fuller Ave.,
Hollywood, Calif. 90028
Filed June 7, 1963, Ser. No. 286,370
25 Claims. (Cl. 340—149)

This application relates to validation means.

In connection with the use of credit cards, and of token-actuated unattended systems, such as parking or fluid-dispensing systems and the like, where tokens such as cards are issued to users the problem of unauthorized use has become very pressing. These tokens are often lost or stolen and frequently are put to use by unauthorized users very quickly. Inasmuch as the issuee of a credit card is presumed to be liable for its use until notifying the company, the propriety of custody by a user is of great importance to its rightful owner.

There is a growing body of law to the effect that, even if not notified, the issuer of a card cannot necessarily secure payment from the issue. It appears that without the exercise of at least some care on the part of a seller or his agent who sells goods charged to the card without checking the propriety of the user, there may be such contributory negligence on the issuer's part as to bar collection from an issuee from whom the card may have been stolen or by whom it may have been lost without negligence. This is a matter of considerable concern to companies which issue credit cards. The problem could be greatly alleviated, and perhaps even overcome entirely, were there provided and used means for validating the propriety of custody in which data known only to the issuer and issuee were an essential element. It is an object of this invention to provide such validating means, which is suitable for both attended and unattended operations.

A validation means according to this invention includes a credit token which contains invisible inherent data indicia in an array known only to the issuer and to the proper holder of the card. Said indicia comprises elements having known physical characteristics. A complementary validation token is adapted to be provided with inherent data indicia in an array complementary to the indicia on the validation token when the authenticating data is used, but which is not complementary for any other data. The complementary nature or its absence may be determined by a reading of the physical property involved, this reading indicating the propriety of custody.

According to a preferred but optional feature of this invention, the credit token is a flat card suitable for being carried in the wallet, and the validating token is also flat. The physical characteristic is preferably capacitance.

According to still another preferred but optional feature of the invention, the credit token bears visual identification of the holder in order to provide a double means for checking the propriety of custody of the card.

The above and other features of this invention will be fully understood from the following detailed description and the accompanying drawings in which:

FIG. 1 is a cross-section view of the presently preferred embodiment of the invention, shown in a fixture which aids in validating the propriety of custody of the card;

FIGS. 2 and 3 are cross-sections taken at lines 2—2 and 3—3 of FIG. 1, respectively;

FIG. 4 is a bottom view of FIG. 3;

FIG. 5 shows a mismatched pair of tokens according to the invention;

FIG. 6 is a top view of a punch suitable for creating a validation token according to this invention;

FIG. 7 is a cross-section taken at line 7—7 of FIG. 6; and

FIG. 8 is an electronic circuit suitable for use with the device of FIG. 1.

FIG. 1 shows a credit token 10 in the form of a flat card of length and width suitable for being carried in the wallet. For purposes of illustration, the thickness of the layers of the credit token have been exaggerated. The token includes a base plate 11 of insulating material, such as polyvinyl chloride. It is stiff enough to keep the card from being readily folded or bent. It serves as a base for invisible, inherent data indicia 12, 13, 14. This invisible, inherent code indicia comprises an array of a selected number of dots in selected geometrical arrangement as will later be described. More or fewer than three of such code indicia may be used. A convenient material for the code indicia, which must be electrically conductive in this embodiment of the invention, is conductive silver ink. Lead wires 15, 16 pass through the base plate and interconnect indicia 12, 13 and 14 with an electrode 16a (sometimes hereinafter referred to as terminal), which is exposed at a recessed portion 17 of a cover 18.

On the other side of the base plate from cover 18 is a second cover 19. Covers 18 and 19 are made of a high dielectric constant material, such as Mylar or Teflon sheet cemented onto the base plate, cover 18 serving as the dielectric material of a condenser assembly when the credit token is validated.

Covers 18 and 19 are opaque, so that neither the code indicia nor the lead wires can be seen. The lead wires are as thin as possible, and might themselves be conductive ink if desired. In fact, the lead wires and code indicia may be prepared with conventional printed circuit techniques.

A validating token 20 is shown laying atop cover 18, and a press comprising platens 21, 22 of insulating material is shown pressing against opposite sides of the stack of two tokens forming an assembled structure comprising the tokens laid in adjacency and held aligned by aligning pins 23, 24. Arrows 25 indicate pressure exerted on the stack by the platens.

Lead 26 is connected to an electrode 26a (sometimes hereinafter referred to as a terminal). The electrode is placed adjacent to the edge of validating token 20 where a perforation will never be made so that it forms no part of the capacitor. Lead 26 terminates at terminal 27. Electrode 26a makes electrical contact with the validating plate when it is in the press. A convenient way is to solder or braze lead 26 to electrode 26a and embed the electrode in the platen with a surface open to the validating token. Lead 28 is connected to a conductive contact block 29, which is mounted to platen 22. Block 29 will contact electrode 16a when the plates are in the press. Platen 22 and the aligning pins may conveniently be made of insulating material. Lead 28 ends at terminal 30. Terminals 27 and 30 will be found again in FIG. 8 in connection with a circuit for use with the device of FIG. 1.

Validating token 20 is shown in greater detail in FIG. 2. It includes a pair of aligning holes 31, 32 to pass the alignment pins and includes inherent data indicia 34, 35, 36, which in this case comprise holes through a conductive metallic validating token. The holes have an inherent physical characteristic different from that of the plate, namely a lack of conductive surface. Code indicia 12–14 also have an inherent difference of the same character. The validating token is made of conductive metal, such as aluminum foil about 0.005″ thick, to form one plate of a condenser assembly. The invisible inherent indicia 12–14 form the other plate of the condenser assembly, with cover 18 acting as the dielectric.

FIG. 3 shows code indicia 12–14 in greater detail together with aligning holes 37, 38 for passing and aligning the aligning pins.

FIG. 5 illustrates the possible alignment and misalignment of the code and validating indicia. FIG. 5 represents a stack 40 of tokens with a validating token 41 atop a credit token. Holes 42, 43, 44 are formed through the validating token. Indicia 45, 46, 47 are formed on the credit token. It will be observed that validating indicia 42 and 43 are not aligned with either of code indicia 45 and 46, while validating indicia 44 registers with code indicia 47. The latter set is complementary; the former are not. The capacitative effects of the sets will be different.

Means is provided for forming the validating token, the preferred embodiment of which is shown in FIGS. 6 and 7. This is essentially a punch device for knocking out portions of a plate which might be partially pre-punched or in which the punches might drill out the unwanted region should burred edges of the hole be objectionable for some reason. The particular method of forming the hole is of no importance to the invention but the ability to form the hole in certain areas is important.

In FIGS. 6 and 7 is shown a template 51 having longitudinal tracks 52, a carriage 53 slidable on the longitudinal tracks, and a slideway 54 on the carriage along which moves a slide 55. This slide carries a punch 56. For purposes of illustration, the vertical direction is divided into A, B and C levels, and the horizontal dimension is divided into 1, 2 and 3 levels, so that combinations of A–1, 2 and 3, B–1, 2 and 3, and C–1, 2 and 3 can be made simply by moving the carriage and slide to the appropriate coordinates and then depressing the punch to form a hole through a blank plate 57 which is backed up by a base 58 with appropriate aligning holes 59 therein. The result of this arrangement is that a person with a code can select and punch out an appropriate array of coded holes to correspond to the code known only to him and to the issuer of the token.

FIG. 8 shows an electronic circuit 65. This circuit is connected to terminals 27 and 30, which terminals are connected to the ends of a coil 66, which is in turn air-coupled to a second coil 67. It will be recognized that across coil 66 through terminals 27 and 30, there is connected a capacitor as shown in FIG. 1, and that this side of the circuit has a resonant frequency. Another coil 67 is air-coupled to coil 66. The other side of the air-coupled circuit starts from the ends of coil 67, which are connected across a variable capacitor 68 which can be adjusted to any value consistent with the remaining parameters of the system to resonate with a selected frequency on the opposite side of the air-coupling.

A milliammeter 69 is connected to one side of this resonant circuit and to the grid 70 of a triode 71. The plate 72 of the triode is connected to one side of a battery 73 or other power source, and the other side of the power source is connected to cathode 74 and to the other side of the parallel-connected coil 67 and variable capacitor 68. A cathode heater circuit is utilized in accordance with standard circuit criteria.

The operation of this device will now be discussed in connection with FIGS. 1–5 and 8. Assume for a moment that the proper holder of the credit token has been assigned some numerical and letter code, such as 1, 2, 3, C, A, B. Such a code would correspond to that shown in FIGS. 2 and 3 where the holes and also the conductive dots are disposed at levels C–1, A–2, and B–3. On the back side of the structure, as shown in FIG. 4, these dots are connected to electrode 16a. Assume that the correct code has been punched in the validating token, as shown in FIG. 2. Then when these tokens are laid in adjacency and in alignment, the indicia will be complementary to each other, and at this position, the capacitance of the assembly will be at a minimum.

Assume now that the person presenting the credit token does not know the correct code, and instead of 1, 2, 3, C, A, B, punches the code shown in FIG. 5, which is 1, 2, 3, A, B, B. Then there will be no complementary relationship at the 1 and 2 levels, and there will be complementary relationship at the 3 level. The value of the capacitance of the assembly will then be greater, because metal portions of the data will be opposed to each other. Now if the circuit can discriminate between these two conditions, validation can be achieved.

Coil 66 and the capacitor assembly comprising the validating and credit tokens, will have a resonant frequency. The resonant freqeuncy will differ as the capacitance of the assembled tokens differs. It has a minimum value in FIG. 1, wherein each hole in the validation token is aligned with a dot on the credit token. The portion of the circuit shown in FIG. 8 can be adjusted to resonate at this frequency by adjusting the capacitance of variable capacitor 68. When this resonant frequency is attained, then the circuit will draw current from the grid circuit, and meter 69 will dip to some datum value. Should there not be resonance because the capacitance is some other value, then the meter will read a larger value. It will be seen that the datum reading of the meter is entirely a function of whether or not the two sides of the circuits resonate with each other, and this in turn is a function of the capacitance of the combination of the validation and credit tokens, and of the setting of capacitor 68. It is independent of the code used, so long as the holes are aligned with the dots. Any misalignment, such as by having one of the holes out of line with one of the dots as shown in FIG. 5, results in a different capacitance wherein the resonant value of the circuit will be different from that which is set in the circuit of FIG. 8. Then the meter will have some reading other than that which corresponds to a resonant situation wherein the validation token carries the correct data.

From the aforesaid, it will be seen that a code can be provided with each card which is known only to the issuer and the proper issuee. It should not be written or otherwise shown on the card, and it should preferably not readily be discoverable from the card itself without destroying the card. Means to outwit persons who would seek to learn this include mixing radio-opaque materials in covers 18 and 19 so that the dots cannot be found by X-ray. Another way is to provide a large number of dots which are not connected to electrode 16a, and which therefore have no effect upon the capacitance. The dots cannot be found by magnetism if they are made of a non-magnetic conducting material, such as silver. Induction methods for locating the spots are not effective if additional disconnected dots are provided.

More or fewer than three code levels in two dimensions may be used, depending upon the degree of security desired. A combination of five letters and five numbers might readily be used. The number of permutations available is very great, and chances of duplication are very small. However, inasmuch as the codes are personal to the user, duplication is not important, particularly in view of the very small probability that such will occur.

The validation techniques shown here provide a means for the ultimate seller of goods to check out the propriety of custody of a credit token. Should the person with the card have the code and be an unauthorized holder, it follows that he has found out the code somehow by the carelessness of the proper holder, such as by the proper holder's having written the code number on the card, thereby destroying the secrecy provision. Such an arrangement would almost certainly overcome any defense of contributory negligence on the part of the seller of the goods. This check-out means would not have to be used for regular customers unless desired by the individual seller, so that in normal operations it would not be a burden.

Other analogous techniques, using different physical characteristics can readily be perceived, such as matching up dielectric material instead of matching up the metallic plates of a condenser, and of course combinations of techniques so long as a practically undiscoverable code data indicia is contained in the credit token which is to be complementarily matched by a validation token.

It will be understood that the term "complementary" does not mean absolute coincidence of all data indicia on the tokens. A code could also be provided in which a certain amount of misalignment of holes and dots would be a part of the code to seek a proper reference level for capacitance in the assembled tokens. Therefore, the term "complementary" as used herein means the complementary aspect of sufficient data indicia to represent a valid matching of data provided by the holder on the validation token, and data provided in the credit token by the issuer of the credit token.

It is evident that visual identification of a proper holder, such as his name and his picture if desired, may be placed on the credit token, so long as it is done in such a way as not to interfere with the physical characteristics which pertain to the validation techniques. Embossing cover 19 with the identification is an example of a suitable visual identification.

This device is obviously useful in circumstances other than those of the straightforward, supervised vending of commodities. It can be utilized to validate unattended systems in which both the credit token and a validation token to be prepared must be submitted to the machine before it will operate. It is also readily adapted to filing systems, identification and sorting devices and the like. However, it is expected to find its most practical use in connection with validation means for credit systems.

This invention is not to be limited by the embodiments shown in the drawings and described in the description which are given by way of example and not of limitation, but only in accordance with the scope of the appended claims.

I claim:

1. A validation system comprising: a credit token bearing invisible, inherent code indicia in an array known only to the issuer and to a proper holder of the token, said code indicia comprising elements having a physical characteristic; a validation token including validation indicia in an array selected by the holder of the credit token, said validation indicia having a physical characteristic; said tokens being adapted to be assembled in contiguous relationship to form a structure having its own physical characteristic; whereby said physical characteristic of the indicia as assembled may be measured, the measured value being indicative of the propriety of custody of the credit token.

2. A validation system according to claim 1 in which the credit token bears visual identification of the holder.

3. A validation system according to claim 1 in which the credit token includes a terminal, and in which the code indicia comprises at least one conductive element adapted to be connected to the terminal on the credit token, and in which the validation token includes a terminal, and in which the validation indicia comprises at least one opening in the validation token.

4. A validation system according to claim 3 in which the validation token is a conductive plate, and in which a dielectric cover overlays the code indicia; the validation token, code indicia and cover forming a capacitor whose capacitance is a function of the complementary or non-complementary relationship of the two arrays of indicia when in the assembled structure.

5. A validation system according to claim 1 in which the physical characteristic of the assembled structure is capacitance.

6. A validation system according to claim 4 in which a coil is adapted to be connected to the terminal on the credit token and to the terminal on the validation token, and thereby across the capacitor comprising the validation and credit tokens to form a resonant circuit and in which another circuit is coupled to said resonant circuit to determine the resonance or lack of resonance as a function of whether the array of validation indicia is complementary to the code indicia.

7. A validation system according to claim 6 in which a press is provided for aligning and compressing the tokens together.

8. A validation system according to claim 6 in which the code indicia comprises regions of conductive metal.

9. A validation system according to claim 8 in which the code indicia is placed upon a base plate.

10. A validation system according to claim 9 in which the cover is opaque.

11. A validation system according to claim 9 in which the cover provides electromagnetic shielding.

12. In a validation system for determining the propriety of custody of a credit token by laying a credit token in contiguous relationship with a validation token to form an assembled structure, by measuring a physical characteristic of the assembled structure, and by indicating the correctness of the arrangement of arrays, the improvement comprising: a credit token bearing invisible, inherent code indicia in an array known only to the issuer and to a proper holder of the credit token, said code indicia elements having a physical characteristic; and a validation token adapted to be provided with inherent validation indicia selected by the holder of the credit token; said validation indicia having a physical characteristic.

13. In a validation system according to claim 12, the credit token further including visual identification of the holder.

14. In a validation system according to claim 12, the credit token further including a terminal, and the code indicia further comprises at least one conductive element adapted to be connected to the terminal on the credit token, and the validation token further including a terminal, and the validation indicia further comprises at least one opening in the validation token.

15. In a validation system according to claim 14, the validation token being a conductive plate and further including a dielectric cover overlaying the code indicia; the validation token, code indicia and cover forming a capacitor whose capacitance is a function of the complementary or non-complementary relationship of the two arrays of indicia when in the assembled structure.

16. In a validation system according to claim 12, the physical characteristic is capacitance.

17. In a validation system according to claim 15, further including a coil adapted to be connected to the terminal on the credit token and to the terminal on the validation token, and thereby across the capacitor comprising the validation and credit tokens to form a resonant circuit and in which another circuit is adapted to be connected to said resonant circuit to determine the resonance or lack of resonance as a function of whether the array of validation indicia is complementary to the array of code indicia.

18. In a validation system according to claim 17, further including a press for aligning and compressing the tokens together.

19. In a validation system according to claim 17, the code indicia further comprising regions of conductive metal.

20. In a validation system according to claim 19, the code indicia being placed on a base plate.

21. In a validation system according to claim 20, the cover being opaque.

22. In a validation system according to claim 20, a cover providing electromagnetic shielding.

23. The method of validating a credit token to determine the propriety of custody of the credit token, said credit token bearing invisible, inherent code indicia in an array known only to the issuer and to a proper holder of the credit token, said method comprising the steps of: providing the credit token indicia with elements having a physical characteristic; providing a validation token with inherent validation indicia in an array adapted to be selected by the holder of the credit token, said validation indicia having a physical characteristic; placing the tokens in an assembled contiguous relationship to form a structure having its own physical characteristic; measuring the said physical characteristic of the assembled structure; indiciating the measured value of the physical characteristic of the assembled structure; and comparing the said indicated measured value with a value which corresponds to that of a credit token with a proper validation token, thereby to determine by said comparison the propriety of possession of the subject credit token.

24. The method according to claim 23 wherein the physical characteristic of the assembled structure is capacitance.

25. The method according to claim 23 wherein the step of placing the tokens in an assembled contiguous relationship to form a structure comprises the steps of: aligning the tokens in contiguous relationship, and pressing the tokens together.

References Cited

UNITED STATES PATENTS

| | | | |
|---|---|---|---|
| 2,294,681 | 9/1942 | Moon | 235—61.116 |
| 2,473,664 | 6/1949 | Taylor | 340—164 |
| 2,714,201 | 7/1955 | Whitehead | 340—149 |
| 2,914,746 | 11/1959 | James | 340—149 |
| 2,967,916 | 1/1961 | Williams | 340—149 X |
| 3,022,381 | 2/1962 | Pferd | 179—6.3 |
| 3,059,070 | 10/1962 | Noregaard | 340—164 |
| 3,215,903 | 11/1965 | Barney | 317—134 |
| 3,239,815 | 3/1966 | Martens | 340—149 |
| 3,052,150 | 9/1962 | Jonker | 340—149 X |

JOHN W. CALDWELL, *Primary Examiner.*

THOMAS B. HABECKER, *Examiner.*

P. XIARHOS, D. J. YUSKO, *Assistant Examiners.*